(12) United States Patent
Vitale et al.

(10) Patent No.: US 8,540,272 B1
(45) Date of Patent: Sep. 24, 2013

(54) EXPANDABLE VEHICLE CHASSIS AND METHOD

(75) Inventors: Robert L. Vitale, Macomb Township, MI (US); Christopher E. Borroni-Bird, Oakland Township, MI (US); Roland J. Menassa, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/467,521

(22) Filed: May 9, 2012

(51) Int. Cl.
*B62B 1/00* (2006.01)

(52) U.S. Cl.
USPC .......................................... 280/638; 296/165

(58) Field of Classification Search
USPC ........... 180/638, 656, 789; 296/26.08, 26.09, 296/184.1, 165
See application file for complete search history.

(56) References Cited

U.S. PATENT DOCUMENTS

| | | | |
|---|---|---|---|
| 3,580,344 A * | 5/1971 | Floyd | 180/8.2 |
| 6,390,537 B1 * | 5/2002 | DiGonis | 296/181.1 |
| 2001/0015299 A1 * | 8/2001 | Moore | 180/243 |

* cited by examiner

*Primary Examiner* — John Walters
*Assistant Examiner* — James Triggs
(74) *Attorney, Agent, or Firm* — Quinn Law Group, PLLC

(57) ABSTRACT

A vehicle chassis includes a vehicle chassis frame. The frame has a first frame portion and a second frame portion operatively connected to the first frame portion. The second frame portion is selectively movable with respect to the first frame portion such that the length of the chassis is selectively variable. The chassis may thus be lengthened to support the addition of an extension unit when additional passenger space or cargo space is desired.

10 Claims, 3 Drawing Sheets

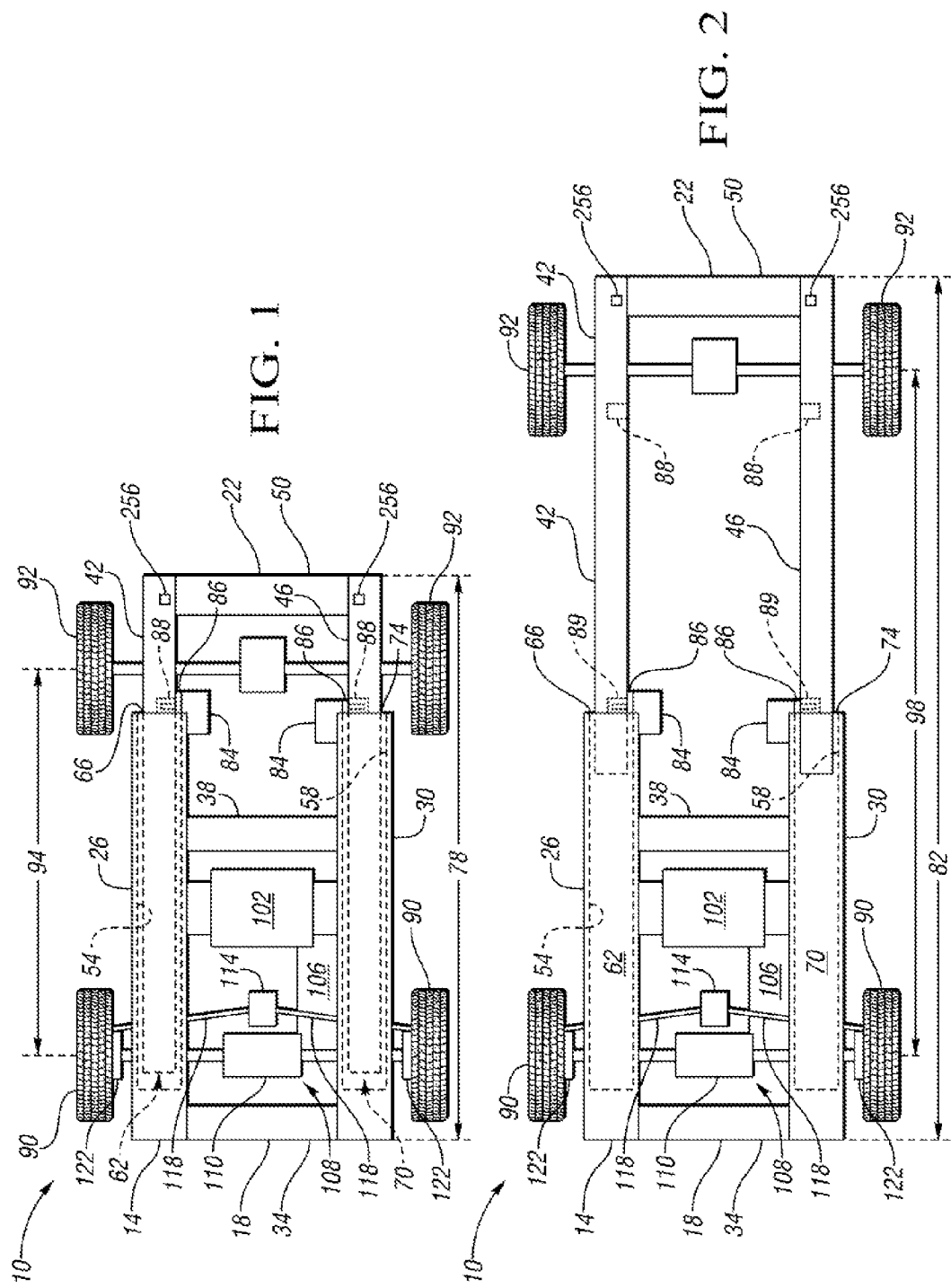

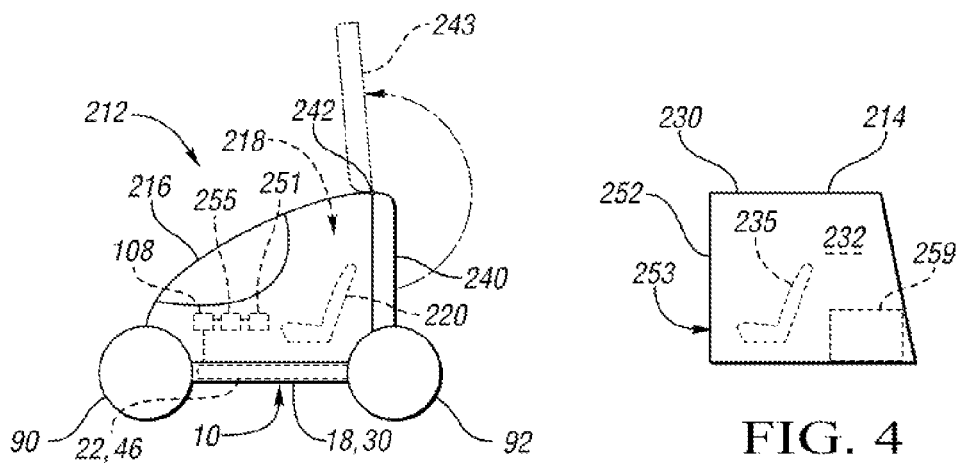
FIG. 3
FIG. 4
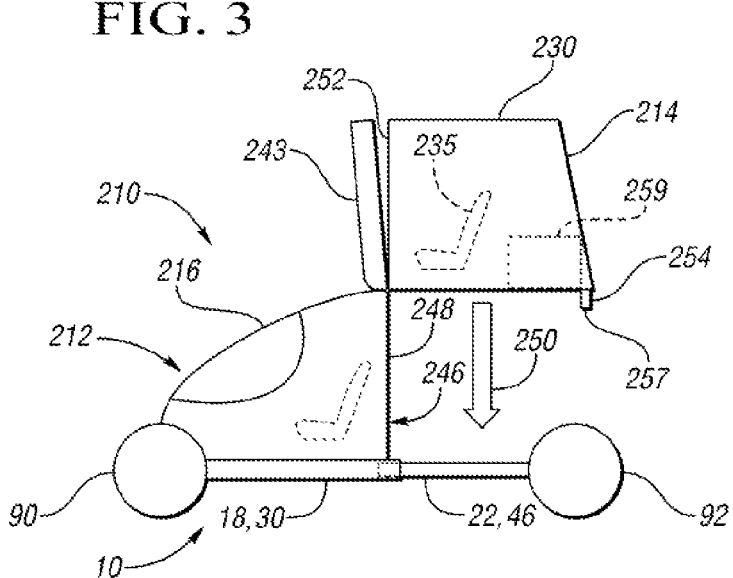
FIG. 5
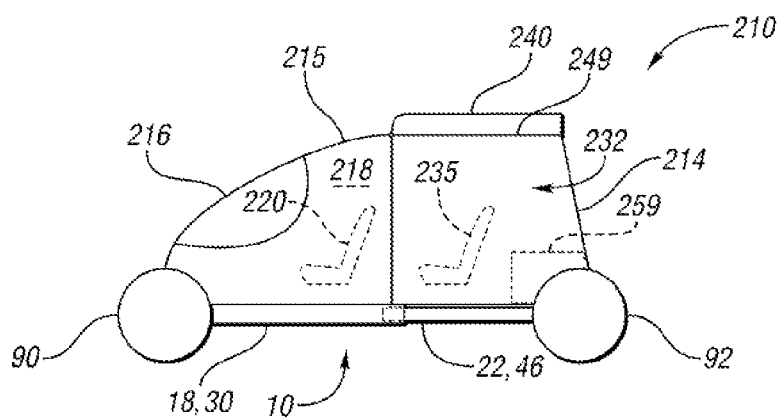
FIG. 6

EXPANDABLE VEHICLE CHASSIS AND METHOD

TECHNICAL FIELD

The present teachings generally include a drivable vehicle that can be selectively expanded and a method of expanding a vehicle.

BACKGROUND

An individual may have different mobility needs on different occasions. For example, the individual may work in an urban area and need to commute to work on a daily basis. For these commuting needs, a fuel efficient vehicle that seats at least the driver and is of a small size that is easy to maneuver and park in a congested area is ideal. On other occasions, the driver may need to transport one or more additional passengers or cargo, may need or desire a higher performance vehicle, or may need to travel a further distance than the typical commute to and from work. Heretofore, the driver would need to use a different vehicle for these occasions.

SUMMARY

A vehicle chassis is provided. The vehicle chassis includes a vehicle chassis frame having a first frame portion and a second frame portion. The second frame portion is operatively connected to the first frame portion, and the frame is characterized by a length. At least three wheels, including at least one front wheel and at least one rear wheel, are rotatably mounted with respect to the chassis frame. The second frame portion is selectively movable with respect to the first frame portion such that the length of the chassis is selectively variable.

The chassis provided facilitates selective expansion of a vehicle. Thus, for example, the chassis may be shortened for use with a small vehicle body attached to it, or the chassis may be lengthened for use with a larger vehicle body attached to it. Similarly, a first vehicle body may be attached to the shortened chassis, and, if a user desires more cargo or passenger space, the chassis may be lengthened to support an extension unit that includes a second vehicle body that is connectable to the first vehicle body.

A vehicle is also provided. The vehicle includes a vehicle chassis. The chassis has a chassis frame having a first frame portion and a second frame portion and is characterized by a length. The second frame portion is movably mounted with respect to the first frame portion such that the second frame portion is selectively movable fore and aft between a first position and a second position. A first vehicle body defines a first interior compartment and is mounted with respect to the first frame portion. The length of the chassis is larger when the second frame portion is in the second position than when the second frame portion is in the first position.

A corresponding method is also provided.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 1 is a schematic, top view of a vehicle chassis in a shortened configuration;

FIG. 2 is a schematic, top view of the vehicle chassis of FIG. 1 in an extended configuration;

FIG. 3 is a schematic, side view of a vehicle including the chassis of FIG. 1 in the shortened configuration and a first vehicle body mounted thereto;

FIG. 4 is a schematic, side view of an extension unit including a second vehicle body;

FIG. 5 is a schematic, side view of the vehicle of FIG. 3 with the chassis in the extended configuration;

FIG. 6 is a schematic, side view of the vehicle of FIG. 3 with the chassis in the extended configuration and the extension unit of FIG. 4 attached to the first vehicle body;

DETAILED DESCRIPTION

Figure 7:
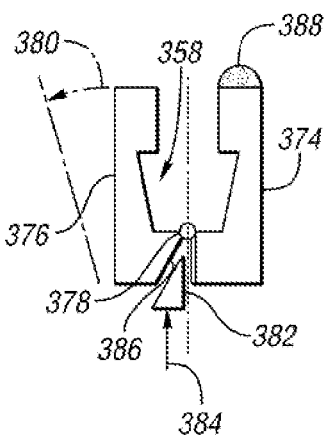
FIG. 7 is a schematic, side view illustration of a second attachment interface of the extension unit of FIG. 4.

Referring to FIG. 1, a vehicle chassis 10 is schematically depicted. The chassis 10 includes a chassis frame 14, which has a first frame portion 18 and a second frame portion 22. In the embodiment depicted, the first frame portion 18 includes two rails 26, 30 that are spaced apart from one another, and that extend fore and aft. The first frame portion 18 also includes two cross-members 34, 38. The cross-members 34, 38 are spaced apart from one another, and extend transversely between the rails 26, 30. The cross-members 34, 38 are rigidly connected to the two rails 26, 30, and thereby interconnect the rails 26, 30.

The second frame portion 22 in the embodiment depicted includes two rails 42, 46 that are spaced apart from one another, and that extend fore and aft. The second frame portion 22 also includes a cross-member 50. The cross-member 50 extends transversely between, and rigidly interconnects, the rails 42, 46.

The second frame portion 22 is movably mounted with respect to the first frame portion 18 such that the chassis 10 is selectively reconfigurable between a first configuration and a second configuration. More specifically, in the embodiment depicted, the rails 26, 30 of the first frame portion 18 are hollow tubes having a rectangular cross section. Thus, each of the rails 26, 30 has a respective inner surface 54, 58. The inner surface 54 of rail 26 defines a hole 62 having an opening 66 at the rearward end of the rail 26. The inner surface 58 of rail 30 defines a hole 70 having an opening 74 at the rearward end of the rail 30. One of the rails 42 of the second frame portion 22 extends into the hole 62 of rail 26 through opening 66. One of the rails 46 of the second frame portion 22 extends into the hole 70 of rail 30 through opening 74.

The holes 62, 70 and the rails 42, 46 are sized such that the rails 42, 46 are selectively slidable with respect to the inner surfaces 54, 58, and thus the rails 42, 46 and, correspondingly, the second frame portion 22, are selectively translatable fore and aft with respect to the first frame portion 18. The rails 26, 30, 42, 46 are configured such that movement of the second frame portion 22 relative to the first frame portion 18 is substantially limited to fore/aft translation. More specifically, the second frame portion 22 is selectively translatable with respect to the first frame portion 18 between a first, retracted position as shown in FIG. 1 and a second, extended position, as shown in FIG. 2.

When the second frame portion 22 is in the first, retracted position with respect to the first frame portion 18, the chassis 10 is in the first configuration and is characterized by a length 78. When the second frame portion 22 is in the second, extended position with respect to the first frame portion 18, the chassis 10 is in the second configuration and is characterized by a length 82, which is greater than length 78. Accordingly, the chassis 10 is selectively reconfigurable between a first configuration having a first length and a second configuration having a second length greater than the first length by moving the second frame portion 22 with respect to the first frame portion 18. Other techniques for mounting the second frame portion with respect to the first frame portion while permitting selective relative movement therebetween may be employed within the scope of the claimed invention.

The chassis 10 includes two locking mechanisms 84 that are mounted with respect to the first frame portion 18, and that are configured to selectively lock the second frame portion 22 in place with respect to the first frame portion 18, thereby preventing unwanted movement of the second frame portion 22 with respect to the first frame portion 18. In the embodiment depicted, each locking mechanism 84 includes a respective movable pin 86. Each rail 42, 46 of the second frame portion 22 defines a respective hole 88 that is aligned with a respective one of the pins 86 when the second frame portion 22 is in the retracted position, as shown in FIG. 1. Each pin 86 is transversely movable into a respective one of the holes 88 when the holes 88 are aligned with the pins 86. When the pins 86 are within a respective hole 88, the pins 86 prevent or restrict fore/aft movement of the second frame portion 22 relative to the first frame portion 18 and thereby maintain the second frame portion 22 in the retracted position.

Referring specifically to FIG. 2, each rail 42, 46 of the second frame portion 22 defines a respective hole 89 that is aligned with a respective one of the pins 86 when the second frame portion 22 is in the extended position. Each pin 86 is transversely movable into a respective one of the holes 89 when the holes 89 are aligned with the pins 86. When the pins 86 are within a respective hole 89, the pins 86 prevent or restrict fore/aft movement of the second frame portion 22 relative to the first frame portion 18 and thereby maintain the second frame portion 22 in the extended position.

The chassis 10 has at least three ground-engaging wheels, including at least one front wheel and at least one rear wheel. In the embodiment depicted, the chassis 10 includes two front wheels 90 that are rotatably mounted with respect to the first frame portion 18, and two rear wheels 92 that are rotatably mounted with respect to the second frame portion 22. Thus, the wheelbase of the chassis 10 is also selectively variable by moving the second frame portion 22 relative to the first frame portion 18, because as the second frame portion 22 moves fore or aft relative to the first frame portion 18, the rear wheels 92 move fore or aft relative to the front wheels 90.

More specifically, and with reference to FIG. 1, when the second frame portion 22 is in the retracted position, the chassis 10 is characterized by a first wheelbase 94. As the second frame portion 22 is moved aft, or rearward, relative to the first frame portion 18, the rear wheels 92, also move aft with the second frame portion 22, whereas the front wheels 90 remain stationary relative to the first frame portion 18. Accordingly, when the second frame portion 22 is in the extended position, as shown in FIG. 2, the chassis 10 is characterized by wheelbase 98, which is greater than wheelbase 94.

The chassis 10 includes an energy storage system which, in the embodiment depicted, is an electrical battery 102. The electrical battery 102 is mounted with respect to the first frame portion 18 in a cavity 106 defined by the rails 26, 30 and cross-members 34, 38. The chassis 10 also includes a first propulsion system 108 configured to the selectively transmit torque to at least one of the wheels. In the embodiment depicted, the first propulsion system 108 includes an electric motor 110. The electric motor 110 is operatively connected to the battery 102 to receive electrical energy therefrom. In the embodiment depicted, the electric motor 110 is operatively connected to the front wheels 90 to transmit torque thereto and thereby propel the chassis 10.

The chassis 10 also includes a steering system 114, which is mounted with respect to the first frame portion 18, and which is operatively connected to the front wheels 90 via tie rods 118. The steering system 114 is configured to selectively vary the steering angle of the front wheels 90, as understood by those skilled in the art. The chassis 10 also includes a braking system 122, which is mounted with respect to the frame 14 and configured to selectively resist rotation of the wheels 90 and thereby reduce the speed of the chassis 10 or prevent movement of the chassis 10, as understood by those skilled in the art.

FIGS. 3-6 schematically depict an expandable vehicle system 210 that includes a drivable vehicle 212 that is drivable as a relatively compact, stand-alone vehicle, and is selectively attachable to an extension unit 214 to form an expanded vehicle 215 as shown in FIG. 5. As shown in FIG. 3, the drivable vehicle 212 has a first body 216 that defines and encloses a first interior compartment 218. The first body 216 includes at least one passenger seat 220 disposed within the first interior compartment 218.

The extension unit 214 has a second body 230 that defines a second interior compartment 232. As used herein, an "interior compartment" includes the space surrounded by the vehicle body, including a passenger compartment if seating is provided, and any cargo area within the interior compartment. The drivable vehicle 212 has a lift gate 240 connected to the remainder of the body 216 at a hinge 242. The lift gate 240 is shown closed in FIG. 3 as well as moved to an open position 243 shown in phantom.

The drivable vehicle 212 includes the chassis 10 of FIGS. 1 and 2. The body 216 is mounted with respect to the first frame portion 18. When the chassis 10 is in the shorter first configuration, as shown in FIG. 3, the first body 216 covers substantially all of the chassis 10. With the chassis expanded to the second configuration, as shown in FIG. 5, the extension unit 214 can be attached to the first body 216 and to the second frame portion 22.

More specifically, the first body 216 has a first attachment interface 248 at least partially surrounding an opening 246 that is exposed when the lift gate 240 is in the open position 243. The second body 230 has an attachment interface 252 at least partially surrounding an opening 253 of the second body 230 that faces the opening 246 in FIG. 5. The attachment interfaces 248, 252 are connected when the extension unit 214 is lowered onto the extended chassis 10 in the direction of arrow 250 as shown in FIG. 5.

The second frame portion 22 includes at least one mechanical fastening component that is selectively engageable with at least one complementary mechanical fastening component on the extension unit 214. In the embodiment depicted, the at least one complementary fastening component on the extension unit includes at least one extension post 254, and the at least one fastening component on the second frame portion includes at least one cavity (shown at 256 in FIGS. 1 and 2) formed in the chassis rails 42, 46. When the extension post 254 is inserted into the cavity 256, lateral and fore/aft movement of the extension unit 214 relative to the chassis is prevented. Other attachment mechanisms to secure the extension unit 214 to the chassis 10 may also be employed within the scope of the claimed invention.

Once the extension unit 214 is positioned on the chassis 10 as shown in FIG. 6, the lift gate 240 is lowered to a second position in which it mates to the roof portion 249 of the extension unit 214, either by using additional attachment interfaces 248, 252 or any other attachment mechanism. In the expanded vehicle 215, the first interior compartment 218 is contiguous with the second interior compartment 232 due to the adjacent openings 246, 253. The expanded vehicle 215 includes the seats of the drivable vehicle 212, such as seat 220, as well as any seats of the extension unit 214, such as seat 235.

The first propulsion system 108 of the chassis 10 can be used to drive the expanded vehicle 215. Optionally, the extension unit 214 may have a second propulsion system 259 that can be operatively connected with the first propulsion system 108 as well as with a control system 251 and an electrical system 255 of the drivable vehicle 212 through an electrical interface 257 of the extension post 254. Connecting wires (not shown) may extend from the first propulsion system 108 and the control system 251 and electrical system 255 to the second propulsion system 259 through the rails 30, 46 to the electrical interface 257 of the extension post 254.

When the larger seating capacity and interior compartment of the expanded vehicle 215 is no longer needed, the extension unit 214 can be detached from the first body 216 and the chassis 10, and the second frame portion 18 can be moved to its refracted position of FIG. 3. The drivable vehicle 212 can then be operated without the extension unit 214.

Figure 8:
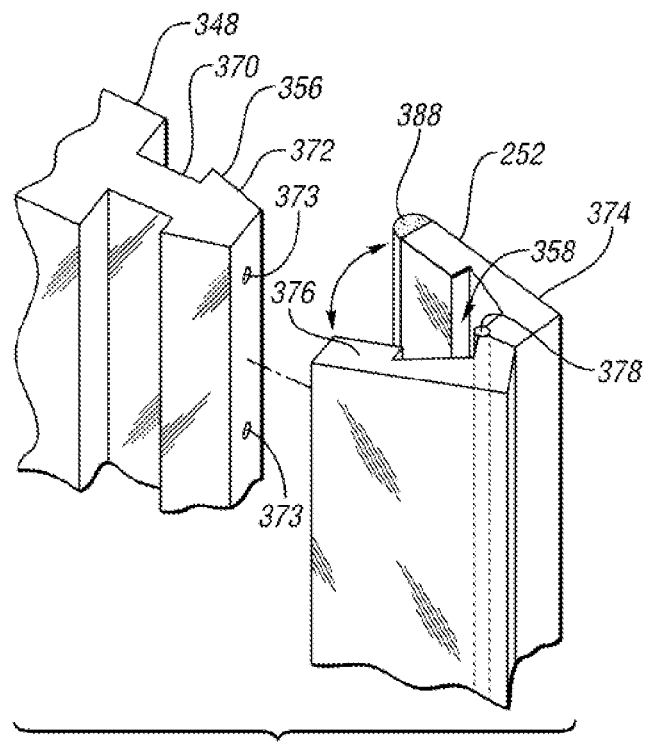
FIG. 8 is a schematic illustration in perspective and exploded view of a first attachment interface of the first body of FIG. 3 and the second attachment interface of the extension unit in partial fragmentary view.

Referring to FIGS. 7-8, the first attachment interface 248 is shown as a three-position attachment interface, having three like extensions of projections 356 along the vertical and lower portions of the body 216 surrounding the opening 246. As best shown in FIG. 8, the projections 356 have a relatively narrow neck portion 370 and an angled head portion 372.

The second attachment interface 252 includes three unitary strips having a first portion 374 and a second portion 376 hinged to the first portion along an axial hinge 378 at which the second portion 376 is pivotable in a direction 380 away from the first portion 374 from a first position shown in FIG. 7 to a second position shown in FIG. 8. When in the first position of FIG. 7, each strip of the second attachment interface 252 forms a recess 358 configured to fit to the corresponding projection 356 of the first attachment interface 248 so that inner surfaces of the second attachment interface 252 at the recess 358 contact the outer surfaces of the projection 356. By pivoting the second portion 376 to the open position, the projection 356 can be easily received between the portions 374, 376. The portion 376 is then moved to the first position to define the recess 358 in which the projection 356 is captured.

A wedge-like locking mechanism 382 can then be moved in a direction 384 to fit into an additional cavity that is a crevice 386 defined between the portions 374, 376 to lock the projection 356 in the recess 358 and thereby mechanically-couple the first body 216 to the extension unit 214. The portion 376 and the crevice 386 are positioned to be accessible to a user attaching the extension unit 214 to the first body 216. It should be understood that other means of locking the attachment interfaces 248, 252 to one another may be used, and the attachment interfaces themselves may have any complementary shapes. A weather seal 388 is secured to the first portion 374 and extends along the length of the first portion 374 to help seal the opening 246 when the first and second attachment interfaces 248, 252 are coupled to one another. Additional seals may be placed within the recess 358.

Figure 9:
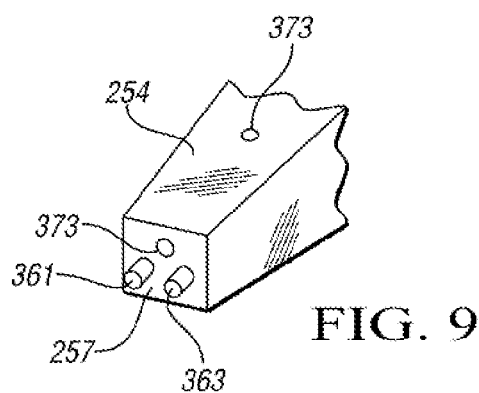
FIG. 9 is a schematic illustration of an electrical interface on the extension unit of FIG. 4.

Referring to FIG. 9, the electrical interface 257 may include a control area network (CAN) bus 361 with connections for information and entertainment systems as well as safety systems, as well as a power bus 363. For example, the CAN bus 361 may communicate propulsion control signals, excess power sharing signals, and brake control commands to the extension unit 214. In this manner, the control system 251 can cooperatively control both the first propulsion system 108 and the second propulsion system 259 to propel the expanded vehicle 215. The second propulsion system 259 may be a small hybrid system that is self-powered by an energy storage unit and has separate onboard controls that communicate with the control system 251 of the drivable vehicle 212 through the CAN bus 361 of the electrical interface 257. By way of nonlimiting example, the first propulsion system 108 may be an electric-only propulsion system, including an energy storage device, such as battery 102, and one or more electric motor/generators 110, so that the drivable vehicle 212, when driven without the extension unit 214, is a battery electric vehicle. The second propulsion system 259 may include an additional energy storage device to provide an extended range for the propulsion system 108, or may be an internal combustion engine, fuel cell, or other type or power source Pressure sensors may be placed between the attachment interfaces 248, 252 to determine the pressure between the attached first body 216 and second body 230. Ideally, the pressure sensors will all indicate a uniform pressure to ensure uniform sealing. In FIG. 9, pressure sensors 373 are used on the end face of the extension posts 254 or the sides of the extension posts 254 to sense when engagement with cavities 256 is complete. Electrical conductors, not shown, connect the pressure sensors 373 to the control system 251 shown in FIG. 3. Alternatively, pressure sensors may be placed on the second attachment interface 252 within the recess 358.

The lift gate 240 may have rear lights (not shown), including running lights, turn lights and brake lights, that are configured to be viewable from the rear both when the lift gate 240 is in the closed position and in the open position. The extension unit 214 may have a duplicate license plate on a rear face that is visible when the extension unit 214 is attached to the drivable vehicle 212, as the license plate attached to the lift gate 240 may not be visible from the rear when the lift gate 240 is in the open position.

The expandable vehicle system 210 described herein provides a flexible mobility solution to meet different mobility needs arising on different occasions. By way of non-limiting example, the fuel efficient drivable vehicle 212 can be used when a single passenger or a few passengers must travel a relatively short distance. If more passengers or cargo needs to be transported, or if a further trip or a trip requiring more power or speed is planned, the extension unit 214 can be attached.

The chassis frame 14 in the embodiment depicted includes two frame sections 18, 22 that are selectively movable with respect to each other to vary the dimensions of the chassis 10. However, it should be noted that a frame may include additional movable portions within the scope of the claimed invention. For example, and within the scope of the claimed invention, the chassis frame 14 may include a third portion (not shown) that is selectively movable with respect to the first frame portion 18 and the second frame portion 22 to further extend the length of the chassis 10.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A vehicle comprising:
a vehicle chassis including a chassis frame having a first frame portion and a second frame portion and being characterized by a length;
said second frame portion being movably mounted with respect to the first frame portion such that the second frame portion is selectively movable fore and aft between a first position and a second position; and
a first vehicle body defining a first interior compartment being mounted with respect to the first frame portion;
wherein the length of the chassis is larger when the second frame portion is in the second position than when the second frame portion is in the first position;
wherein the first vehicle body covers substantially all of the chassis frame when the second frame portion is in the first position; and
wherein at least part of the second frame portion is not covered by the first vehicle body when the second frame portion is in the second position.

2. The vehicle of claim 1, wherein the first body includes an attachment interface at which an extension unit having a second body defining a second interior compartment is operatively connectable to the first body such that the first interior compartment is contiguous with the second interior compartment.

3. The vehicle of claim 2, wherein the chassis includes at least one mechanical fastening component that is engageable with a complementary fastening component on the second body to fasten the second body to the second frame portion.

4. The vehicle of claim 2, further comprising the extension unit operatively connected to the first body such that the first and second interior compartments are contiguous.

5. The vehicle of claim 4, wherein the chassis includes a first propulsion system mounted with respect to the frame, and wherein the extension unit includes a second propulsion system mounted with respect to the second body.

6. The vehicle of claim 1, wherein the chassis further includes at least three wheels rotatably mounted with respect to the frame.

7. The vehicle of claim 6, wherein said at least three wheels includes at least one front wheel rotatably mounted with respect to the first frame portion and at least one rear wheel mounted with respect to the second frame portion; and
wherein movement of the second frame portion relative to the first frame portion causes movement of said at least one rear wheel relative to said at least one front wheel.

8. A method comprising:
providing a vehicle having a vehicle chassis frame and at least three wheels rotatably mounted with respect to the chassis frame, said chassis frame having a first frame portion and a second frame portion movably mounted with respect to the first frame portion, and said vehicle having a first vehicle body mounted with respect to the first frame portion; and
increasing the length of the vehicle chassis by moving the second frame portion with respect to the first frame portion from a retracted position, in which the second portion is substantially entirely covered by the first vehicle body, to an extended position in which at least part of the second portion is uncovered by the first vehicle body.

9. The method of claim 8, wherein the first vehicle body defines a first interior compartment;
and
wherein the method further comprises operatively connecting a second vehicle body defining a second interior compartment to the first vehicle body such that the first and second interior compartments are contiguous.

10. The vehicle of claim 3, wherein the first body defines a first opening and the second body defines a second opening; and
wherein the first and second openings are adjacent one another when the second body is operatively connected to the first body at the attachment interface.

* * * * *